US011571935B2

(12) United States Patent
Finkle et al.

(10) Patent No.: US 11,571,935 B2
(45) Date of Patent: Feb. 7, 2023

(54) TIRE INFLATOR

(71) Applicants: Louis J. Finkle, Lakewood, CA (US); Robert Carale, Palm Springs, CA (US)

(72) Inventors: Louis J. Finkle, Lakewood, CA (US); Robert Carale, Palm Springs, CA (US)

(*) Notice: Subject to any disclaimer, the term of this patent is extended or adjusted under 35 U.S.C. 154(b) by 286 days.

(21) Appl. No.: 16/593,472

(22) Filed: Oct. 4, 2019

(65) Prior Publication Data

US 2021/0101420 A1 Apr. 8, 2021

(51) Int. Cl.
*B60C 23/00* (2006.01)

(52) U.S. Cl.
CPC ................... *B60C 23/003* (2013.01)

(58) Field of Classification Search
CPC ............ B60C 23/003; B60C 23/00318; B60C 23/00305; B60C 23/00309; B60C 23/00336; B60C 23/00345; B60C 23/00363
See application file for complete search history.

(56) References Cited

U.S. PATENT DOCUMENTS

| 2,149,797 | A | * | 3/1939 | Starke ............... B60C 23/00318 152/417 |
| 4,019,552 | A | | 4/1977 | Tsuruta |
| 4,431,043 | A | | 2/1984 | Goodell et al. |
| 5,398,743 | A | * | 3/1995 | Bartos .................. B60C 23/003 137/225 |
| 5,556,489 | A | | 9/1996 | Curlett et al. |
| 9,308,786 | B2 | | 4/2016 | Stoychev et al. |
| 9,446,637 | B2 | | 9/2016 | Knapke et al. |
| 10,137,746 | B2 | | 11/2018 | Tiziani et al. |
| 2011/0203710 | A1 | | 8/2011 | Hinojosa, Jr. et al. |
| 2014/0271261 | A1 | | 9/2014 | Boelryk |
| 2014/0363271 | A1 | * | 12/2014 | Wagemann ....... B60C 23/00354 415/13 |
| 2016/0121667 | A1 | | 5/2016 | Benedict |
| 2017/0129293 | A1 | * | 5/2017 | Knapke ............ B60C 23/00318 |
| 2018/0186197 | A1 | | 7/2018 | Tsiberidou et al. |
| 2020/0139772 | A1 | * | 5/2020 | Vogelpohl ............... B60C 23/16 |

FOREIGN PATENT DOCUMENTS

| CN | 203888548 | | 10/2014 | |
| CN | 104648060 | | 5/2015 | |
| EP | 0071278 | A2 | 2/1983 | |
| JP | 2002087029 | A * | 3/2002 | ....... B60C 23/00363 |
| RU | 2532631 | | 11/2014 | |

OTHER PUBLICATIONS

Machine Translation of JP 2002087029 A, 17 pages (Year: 2002).*

* cited by examiner

*Primary Examiner* — S. Joseph Morano
*Assistant Examiner* — Emily G. Castonguay
(74) *Attorney, Agent, or Firm* — Averill & Green; Kenneth L Green

(57) ABSTRACT

A tire inflator/bleed system allows tire pressure to be adjusted using controls in a vehicle and while in motion. The inflator system includes a disk portion which rotates with a wheel, and a ring portion rotatably attached to the disk. The disk may be a spacer between the wheel and a vehicle hub, be part of the wheel, or be part of the hub. The ring portion receives air from an air supply/bleeder and is in fluid communication with the disk portion to provide the air to or from the disk portion. The disk portion is in fluid communication with a tire interior to add or remove air from the tire.

19 Claims, 10 Drawing Sheets

TIRE INFLATOR

BACKGROUND OF THE INVENTION

The present invention relates to inflating vehicle tires and in particular to a system allowing inflating vehicle tires on a moving vehicle.

Various systems have been developed to inflate tire on moving vehicles. U.S. Pat. No. 4,431,043 for "Automatic Tire Inflation System" discloses a complex automatic tire inflation system which includes a non-rotating flange 26 over an axle 12. Air enters the flange and through an opening 76 into chamber 60 between the flange 26 and wheel 14, and through an opening 78 and into a cavity 34 in the wheel. Air is then routed into the tire. The device of the '043 patent provides the desired function, but is complex and expensive, and is not a simple add-on to existing vehicles. Other patents and patent applications disclose similar systems, but also are complex and not suitable as add-ons to existing vehicles. Therefore a need remains for a simple add-on tire inflator for existing vehicles.

BRIEF SUMMARY OF THE INVENTION

The present invention addresses the above and other needs by providing a tire inflator/bleed system which allows tire pressure to be adjusted using controls in a vehicle and while in motion. The inflator system includes a disk portion which rotates with a wheel, and a ring portion rotatably attached to the disk. The disk may be a spacer between the wheel and a vehicle hub, be part of the wheel, or be part of the hub. The ring portion receives air from an air supply/bleeder and is in fluid communication with the disk portion to provide the air to or from the disk portion. The disk portion is in fluid communication with a tire interior to add or remove air from the tire.

In accordance with one aspect of the invention, there is provided a tire inflator/bleed system integrated into a vehicle wheel. A disk portion corresponds to a center of the wheel, and a ring portion resides around the wheel center.

In accordance with another aspect of the invention, there is provided a tire inflator/bleed system integrated into a wheel spacer. A disk portion corresponds to the wheel spacer residing between the wheel and a hub, and a ring portion resides around the spacer.

In accordance with yet another aspect of the invention, there is provided a tire inflator/bleed system integrated into a vehicle hub. A disk portion is formed on an outside portion of the hub, and a ring portion resides around the disk.

In accordance with yet another aspect of the invention, there is provided a tire inflator/bleed system not requiring bearings. Carbon-PTFE wedges are sandwiched between wear rings made from hardened steel or composite ceramic silicon carbide. The wedge shape naturally centers the ring and springs press the wedges together maintaining enough force to keep the Viton seals from leaking under pressure up to 50 to 60 psi. The wedge design also provide a pressure safety feature if over pressure occurs.

In accordance with still another aspect of the invention, there is provided a tire inflator/bleed system including a disk rotating with a vehicle wheel, and a ring rotatably attached to the disk. A supply/bleed is in fluid communication with the ring, the ring is in fluid communication with the disk, and the disk is in fluid communication with a tire, to inflate and deflate the tire. Viton O-rings between the ring and disk provide an air seal.

In accordance with still another aspect of the invention, there is provided a tire inflator/bleed system residing entirely outside a brake drum or disk brake rotor, and inside a wheel.

In accordance with another aspect of the invention, there is provided a bearingless tire inflator/bleed system. An important application of the tire inflator/bleed system is to off road vehicles which require adjusting tire pressure for various terrain. Such vehicles often encounter water and mud, and bearings often fail in these environments. In one embodiment, the tire inflator/bleed system avoids bearings to avoid failures and the high cost of large diameter bearings.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1:
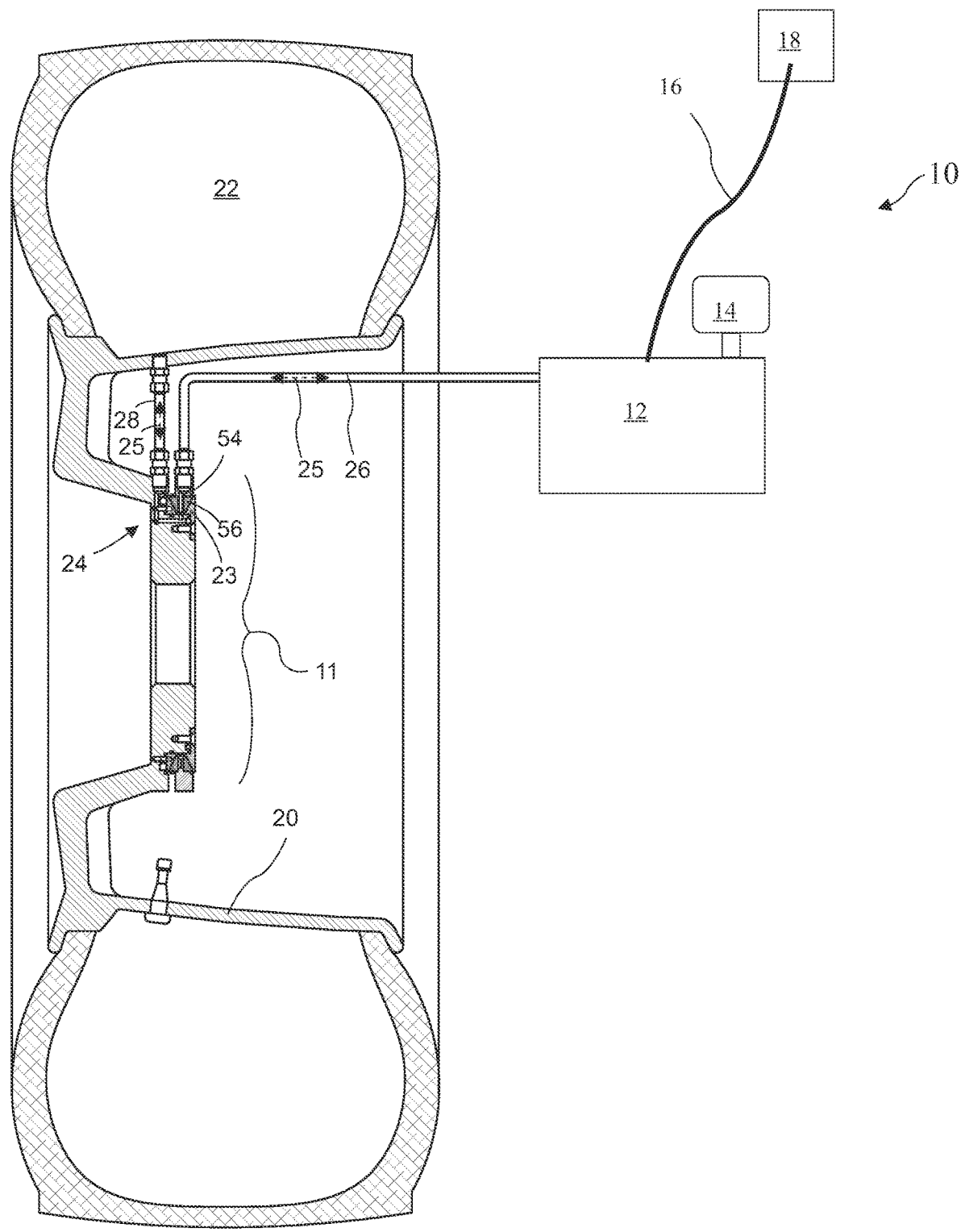
FIG. 1 shows a first vehicle tire inflator/bleed according to the present invention integrated into a wheel.

A first vehicle tire inflator/bleed 10 integrated into a wheel 20 is shown in FIG. 1. A center portion of the wheel 20 corresponds to a disk 11 of the vehicle tire inflator/bleed 10. The vehicle tire inflator/bleed 10 includes an air supply/bleed unit 12, an air filter 14, a control cable 16, a control 18, and the air transfer assembly 24. The air supply/bleed unit 12 includes an air source, for example a compressed air tank or an air compressor, and valving to add and release air from a tire 22. A first air line 26 carries an air flow 25 between the air supply/bleed unit 12 and an air transfer assembly 24, and a second air line or passage 28 carries the air flow 25 to and from the air transfer assembly 24 through the wheel 20 and into the tire 22. A retainer 23 fixed to the wheel 20 retains a ring 54, the ring 54 free to rotate with respect to the wheel 20. Seals 56 reside radially between the disk 11 and ring 54. The first air line 26 in fluid communication with the ring 54. The air flow 25 serially through the ring 54, the seals 56, and the disk 11.

Figure 2:
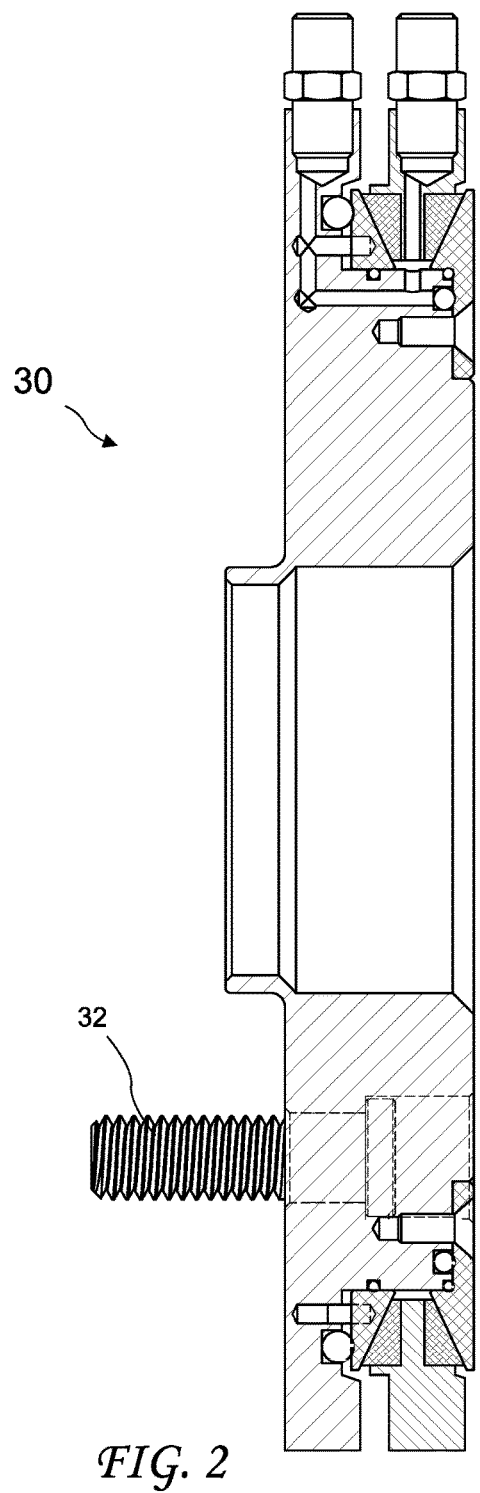
FIG. 2 shows the first vehicle tire inflator/bleed according to the present as part of a hub.

The first vehicle tire inflator/bleed 10 is part of a hub (for example, a hub for mounting the vehicle wheel) 30 including the air transfer assembly 24 and lug nut studs 32 for mounting a standard wheel, is shown in FIG. 2.

Figure 3:
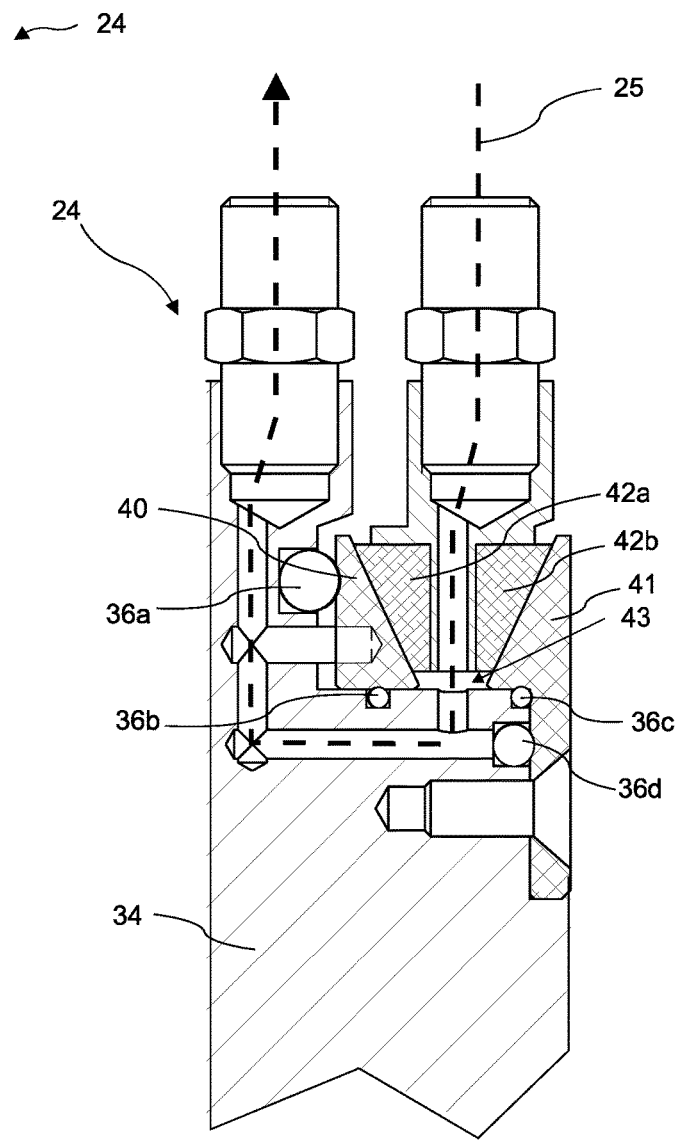
FIG. 3 shows a detailed view of an air transfer assembly of the first vehicle tire inflator/bleed according to the present invention.

FIG. 3 shows a detailed view of the air transfer assembly 24 of the first vehicle tire inflator/bleed 10. An annular air path is created by an annular gap 43 between seal rings 42a and 42b and an outer annular surface 35 (see FIG. 4) of a hub body 34. The annular gap keeps the inlet nipple 48 in fluid communication with the outlet nipple 50 through 360 degrees of rotation of the ring 44 with respect to the disk. The seal rings 42a and 42b are held between a floating ring 40 and a fixed ring 41. O-Rings 36a-36d seal the assembly. The floating ring 40, the fixed ring 41, and the seal rings 42a and 42b form a tapered seal assembly.

Figure 4:
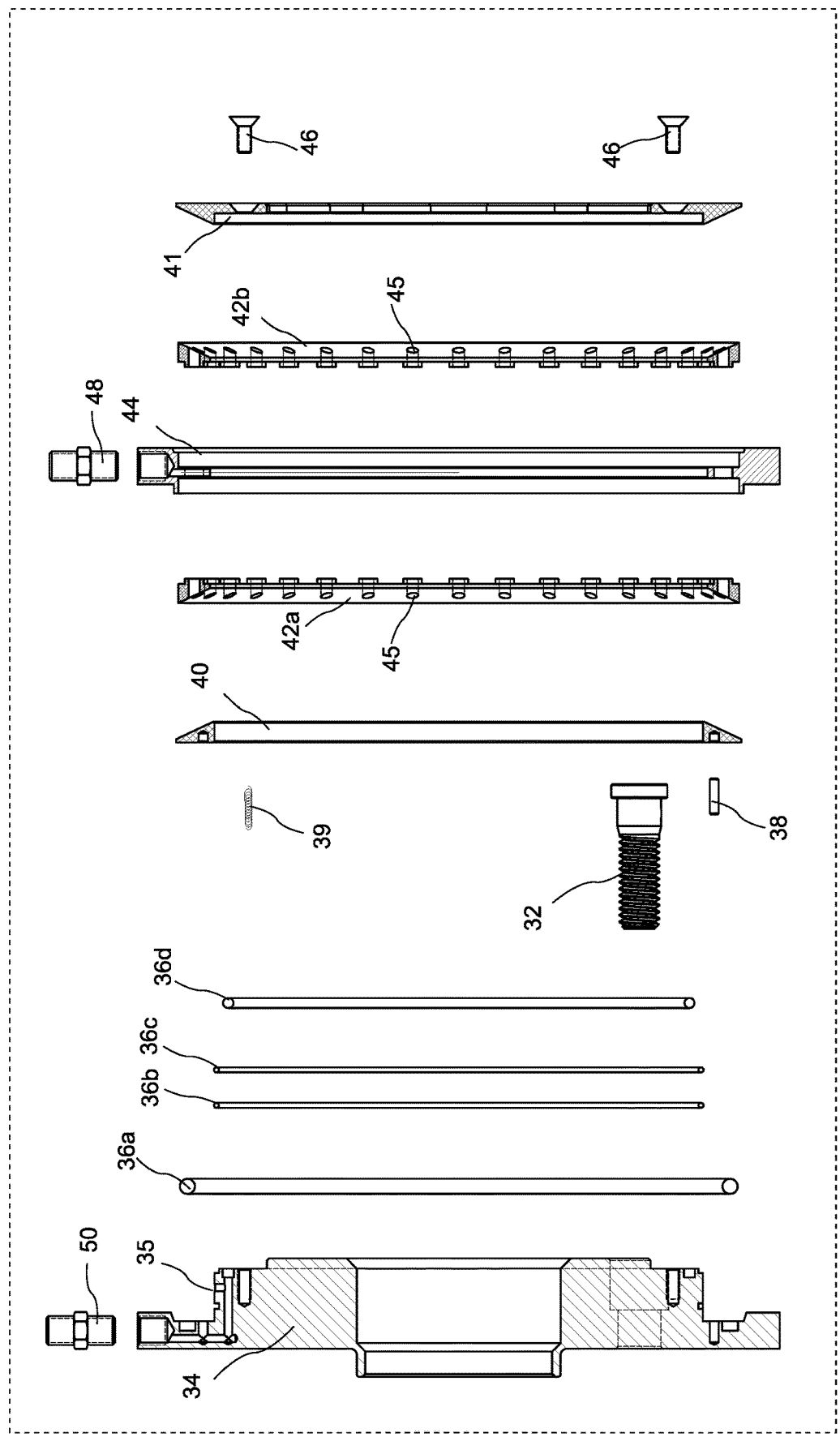
FIG. 4 shows an exploded view of the first vehicle tire inflator/bleed according to the present.

An exploded view of the hub 30 including the air transfer assembly 24 is shown in FIG. 4. The hub 30 includes a hub body 34, O-ring seals 36a-36d, positioning dowels 38, floating ring 40 and fixed ring 41 attached by screws 46, seal rings 42a and 42b, and center ring 44, and springs 39 pressing the floating ring 40 against the seal rings 42a and 42b. An inlet nipple 48 provides fluid communication between the first air line 26 and the center ring 44, and an outlet nipple 50 provides fluid communication between the hub body 34 and the second air line 28. Lubricant passages 45 are provided through the seal rings 42a and 42b which may contain lubricant for the contact of the seal rings 42a and 42b with the center ring 44.

The hub 30 is preferably made from metal, more preferably from aluminum, and most preferably from 6061 aluminum. The floating ring 40 and fixed ring are preferably made from ore-heat treated tool steel and more preferably from P20 tool steel. The seal rings 42a and 42b are preferably made from carbon-PTFE material or the like. The center ring 44 is preferably made from metal, more preferably from aluminum, and most preferably from 6061 aluminum. The O-rings 36a-36d are preferably rubber and more preferably rubber and more preferably a rubber sold under the Viton® trademark.

Figure 6:
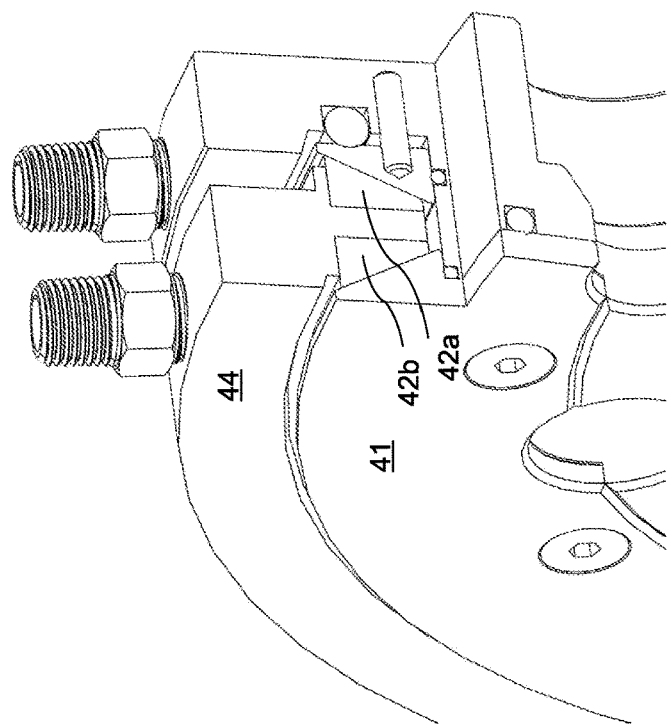
FIG. 6 shows a second cutaway view of the first vehicle tire inflator/bleed according to the present invention.
Figure 5:
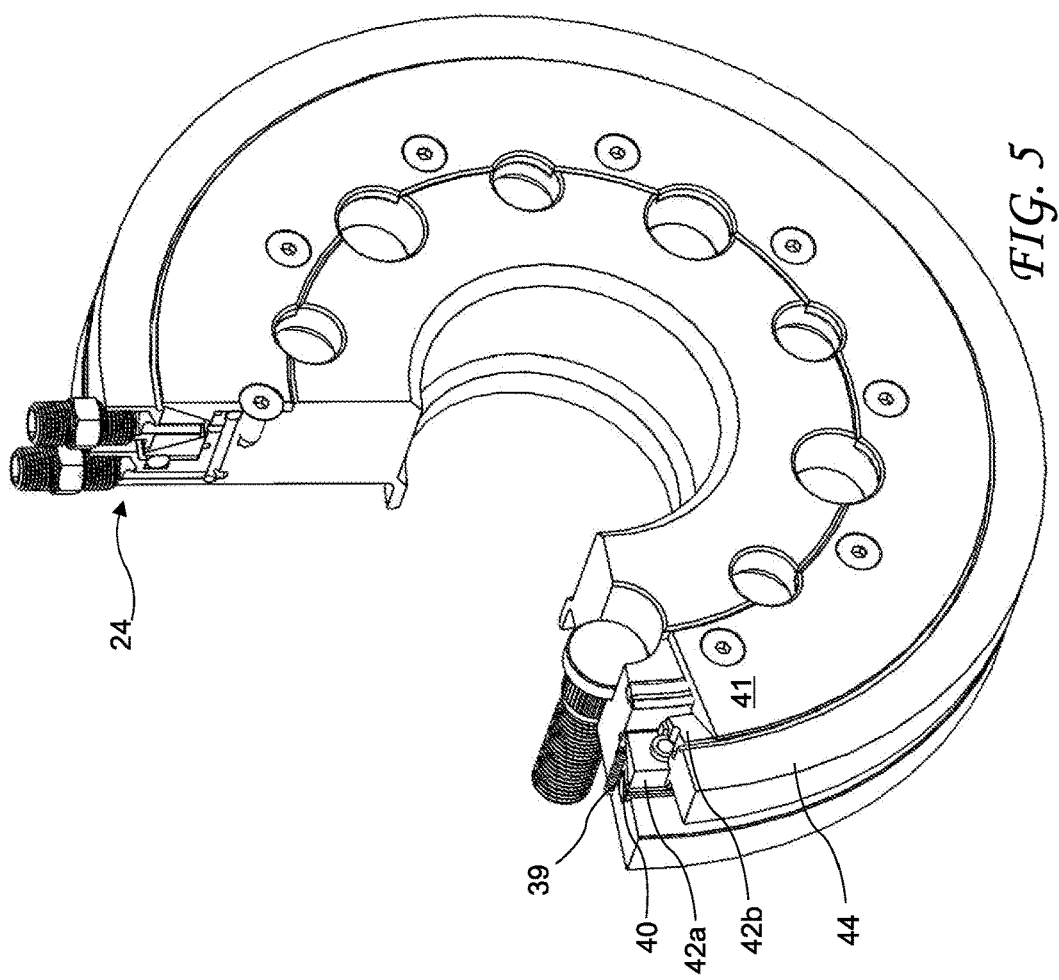
FIG. 5 shows a cutaway view of the first vehicle tire inflator/bleed according to the present invention.

FIG. 5 shows a cutaway view of the first vehicle tire inflator/bleed 10 and FIG. 6 shows a second cutaway view of the first vehicle tire inflator/bleed 10. The spring 39 is shown pressing the floating ring 40 against the seal rings 42a and 42b.

Figure 8:
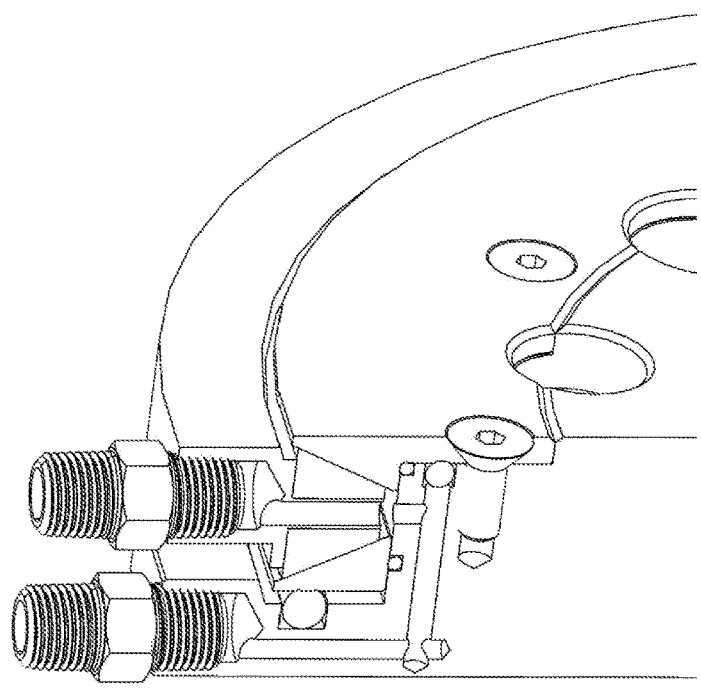
FIG. 8 shows a fourth cutaway view showing a detailed view of detailed view of the air transfer assembly of the first vehicle tire inflator/bleed according to the present invention.
Figure 7:
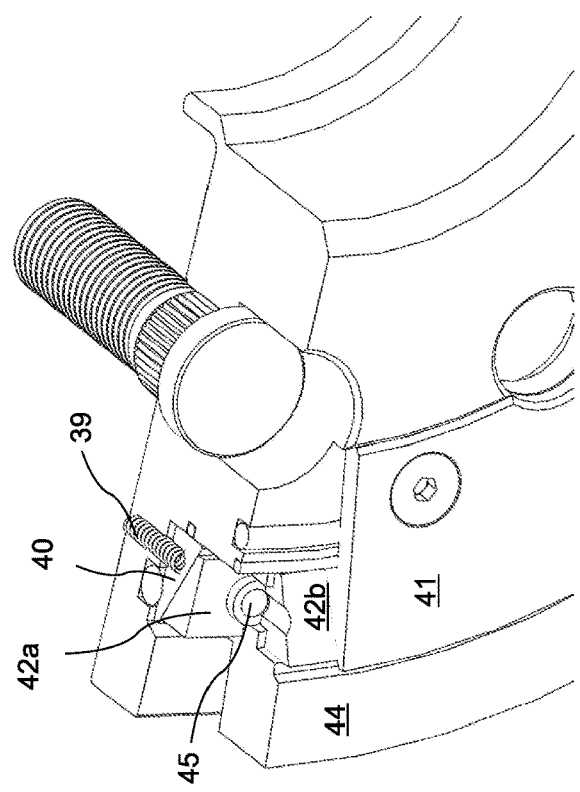
FIG. 7 shows a second cutaway view of the first vehicle tire inflator/bleed according to the present invention showing a lug nut stud.

FIG. 7 shows a second cutaway view of the first vehicle tire inflator/bleed 10 showing a lug nut stud and FIG. 8 shows a fourth cutaway view showing a detailed view of detailed view of the air transfer assembly of the first vehicle tire inflator/bleed 10. The lubricant passages 45 through the seal rings 42a and 42b are shown providing lubricant for the contact of the seal rings 42a and 42b with the center ring 44.

Figure 9:
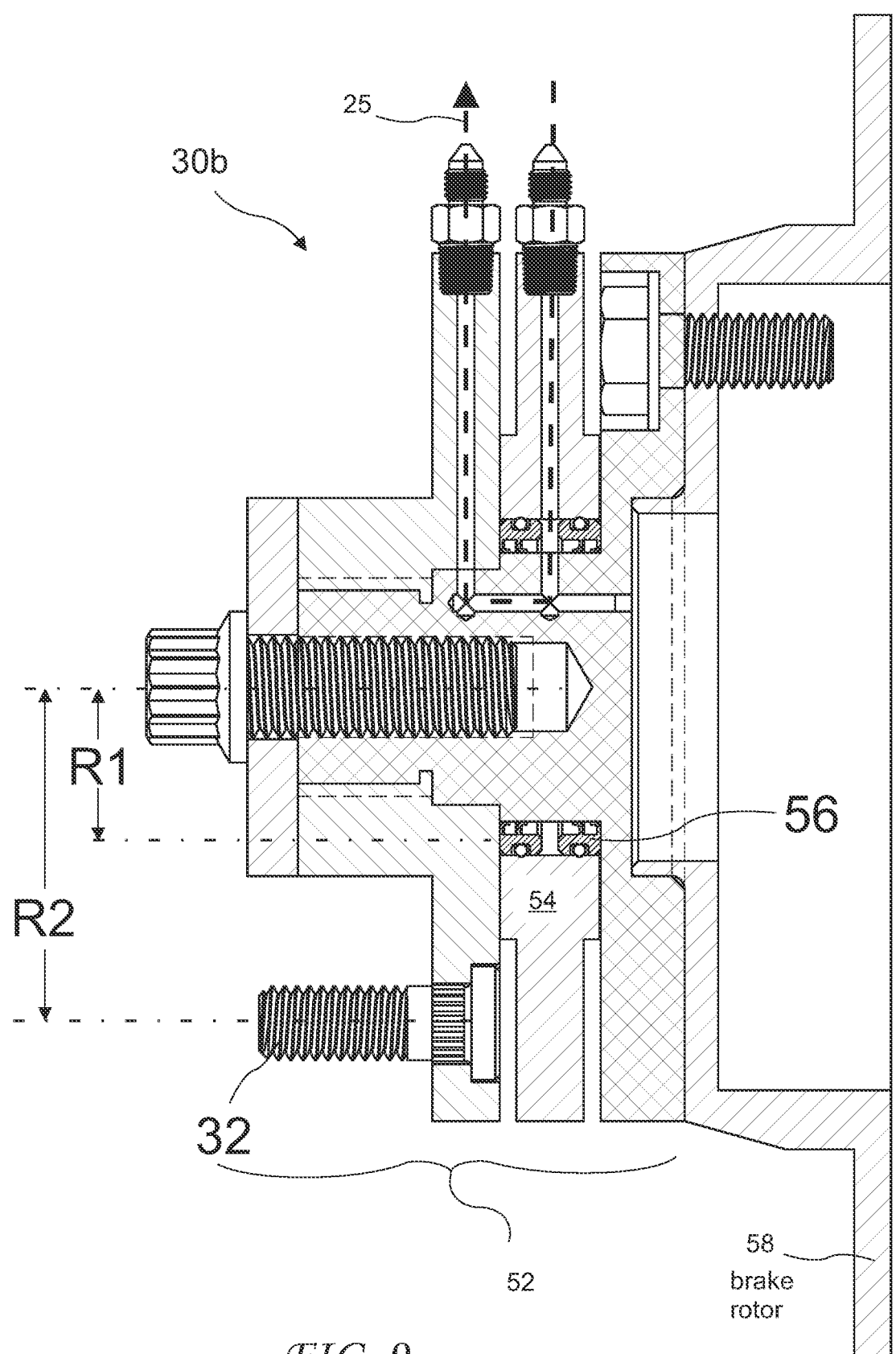
FIG. 9 shows a second vehicle tire inflator/bleed according to the present invention integrated into a hub.
Figure 10:
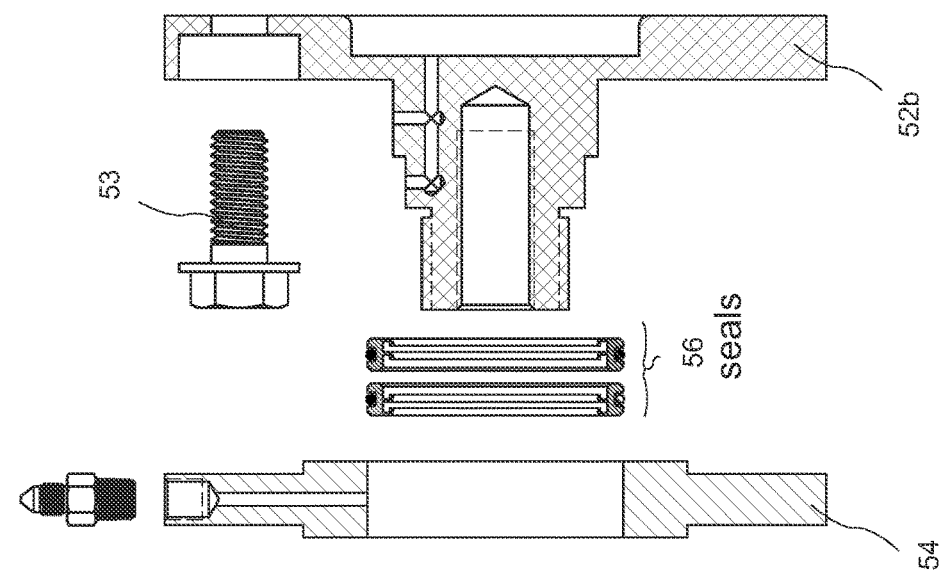
FIG. 10 shows an exploded view of the second vehicle tire inflator/bleed according to the present.

FIG. 9 shows a second vehicle tire inflator/bleed 30b integrated into a hub 52, and FIG. 10 shows an exploded view of the second vehicle tire inflator/bleed 30b. The second vehicle tire inflator/bleed 30b includes an outer hub 52a including lug nut studs 32, is fixed to an inner hub 52b. A ring 54 resides between the outer and inner hubs 52a and 52b and is free to rotate independently of the hubs 52a and 52b. Seals 56 contain air passing through the second vehicle tire inflator/bleed 30b. A disk brake rotor 58 is attached to the hub 52, and the vehicle tire inflator/bleed 30b is seen to reside between the rotor 58 and a vehicle wheel. Rotor fasteners 53 hold the rotor 58 to the inner hub 52b. The seals 56 reside at a seal radius S1 and the lug nut studs 32 reside at a stud radius R2.

Figure 11:
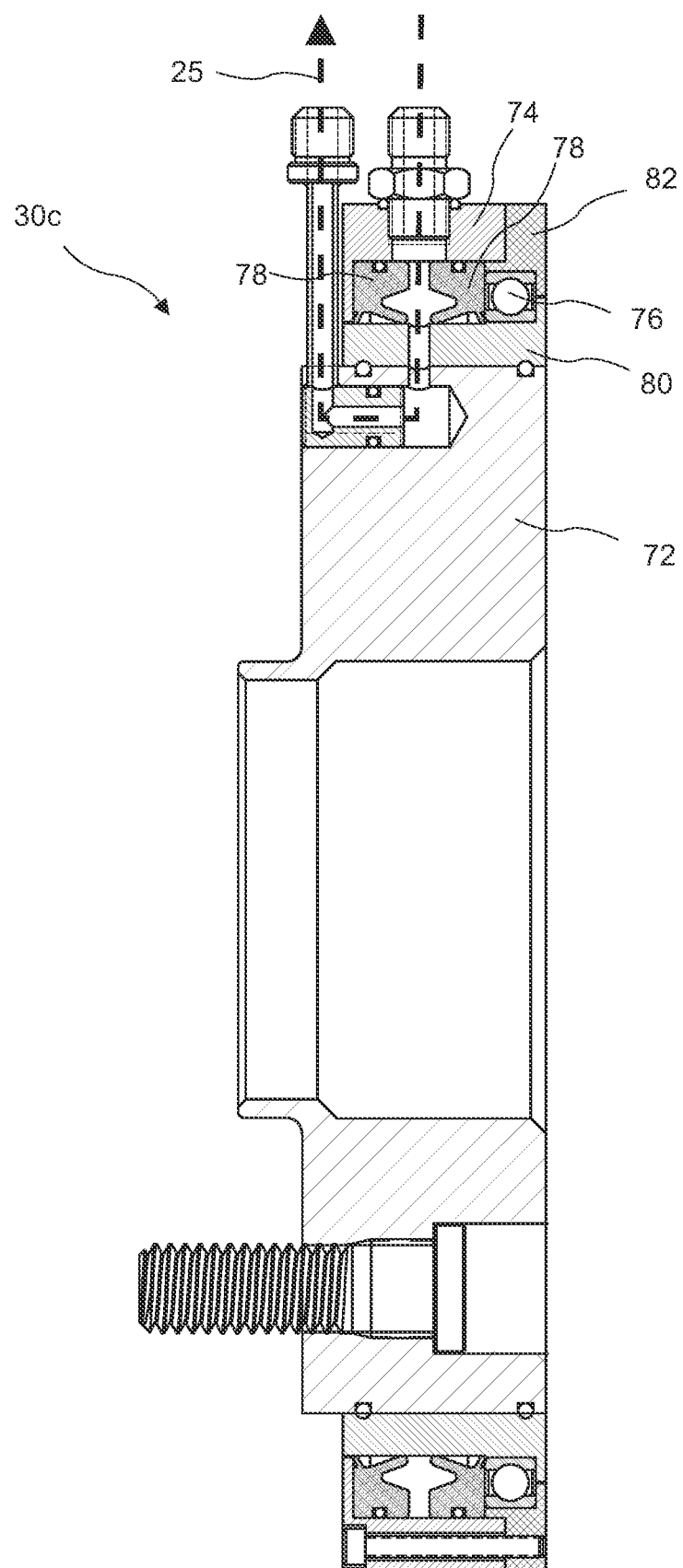
FIG. 11 shows a third vehicle tire inflator/bleed according to the present invention integrated into a wheel hub.
Figure 12:
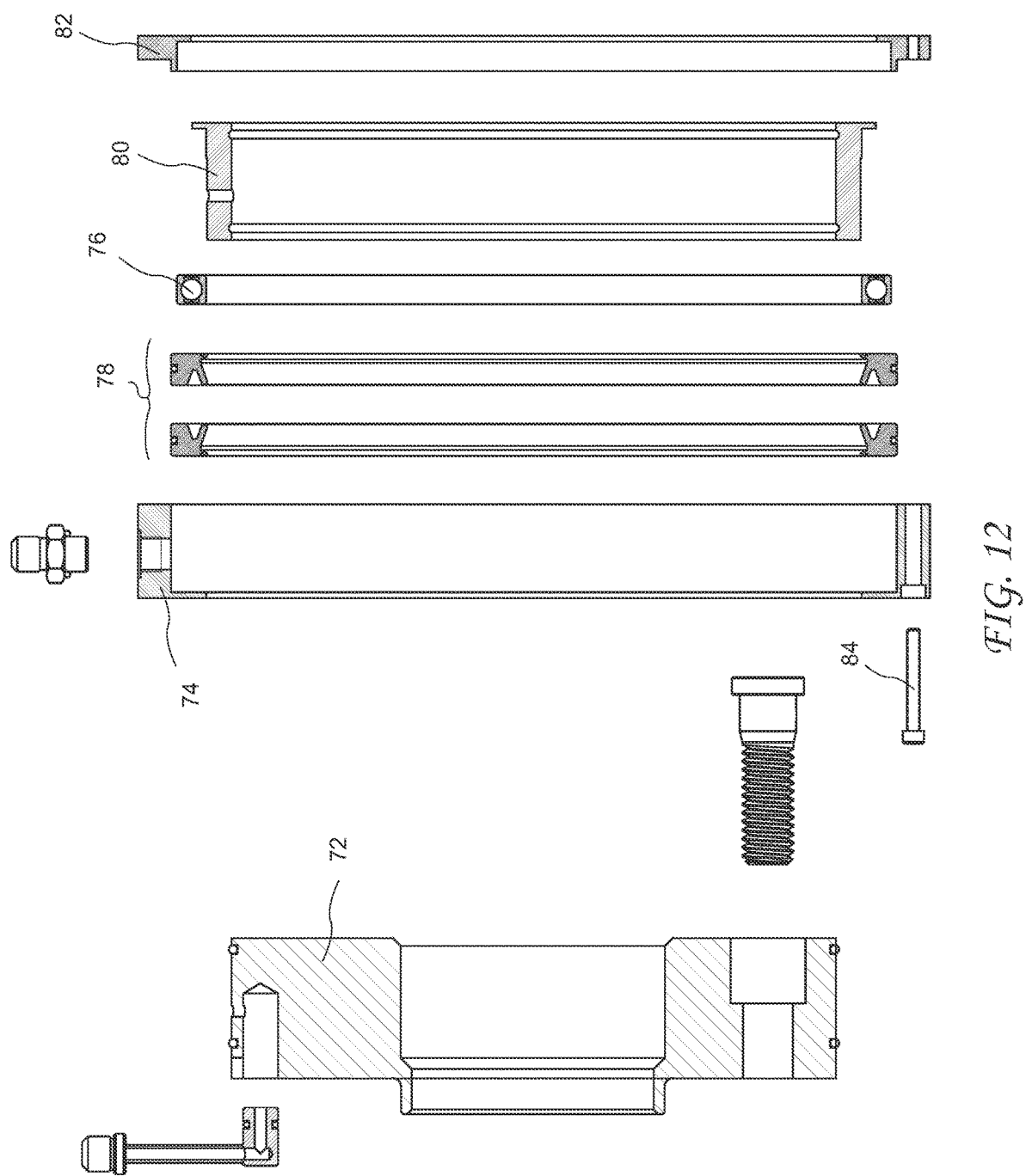
FIG. 12 shows an exploded view of the third vehicle tire inflator/bleed according to the present.

FIG. 11 shows a third vehicle tire inflator/bleed 30c integrated into a wheel hub, and FIG. 12 shows an exploded view of the third vehicle tire inflator/bleed tire inflator/bleed 30c. The vehicle tire inflator/bleed tire inflator/bleed 30c includes a hub 72, a ring 74 rotating freely on the hub 72, a seal seat 80, seals 78, a bearing 76, and an assembly ring 82. The vehicle tire inflator/bleed tire inflator/bleed 30c is assembled by fastening the assembly ring 82 to the ring 74 using fasteners 84. A bearing 76 resides between the assembled ring 74, and assembly ring 82 and the seal seat 80.

The bearing 76 is preferably a thin section bearing having larger diameter then cross section. The seals 78 are preferably non-rubber seals and more preferably a compound of PTFE and carbon graphite composition suitable for operation without lubrication and at high surface speeds.

Figure 13:
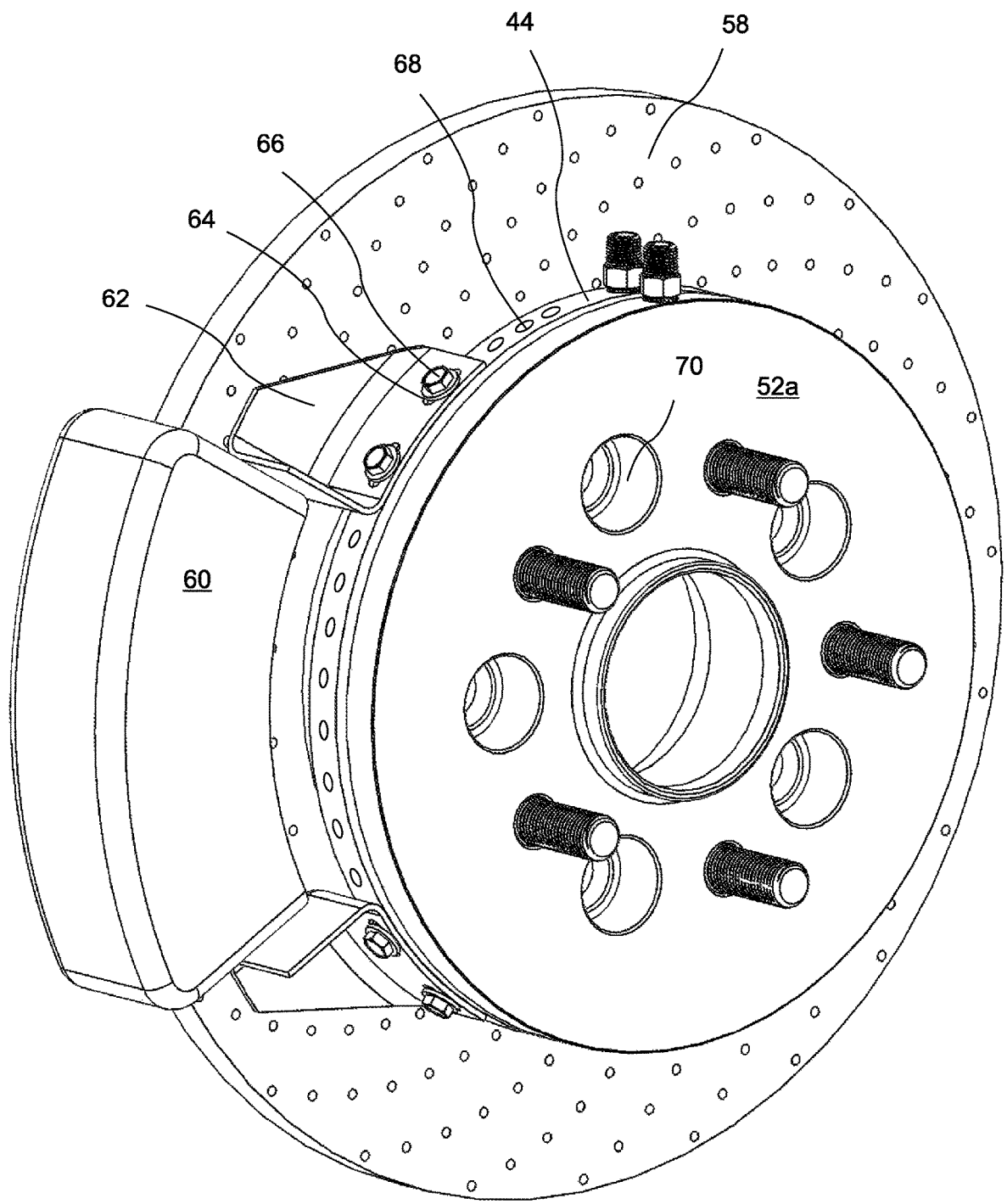
FIG. 13 shows a caliper and ring positioners of the vehicle tire inflator/bleed according to the present.

A caliper 60, and at least one ring positioner(s) 62 which limit rotation of the ring 44, 54, or 74 (see FIGS. 4, 10, and 12) is shown in FIG. 13. The ring 44, 54, or 74 includes holes (preferably threaded holes) 68. The ring positioners 62 are attached to the ring 44, 54, or 74 using fasteners (for example screws) 66 through slots 64 engaging the holes 68. The particular holes 68 and position in the slots 64 allow precise positioning of the ring 44, 54, or 74. Passages 70 may be provided in the hub 52a see FIG. 10) to remove and replace rotor fasteners 53 to remove and replace the rotor 58.

While the invention herein disclosed has been described by means of specific embodiments and applications thereof, numerous modifications and variations could be made thereto by those skilled in the art without departing from the scope of the invention set forth in the claims.

We claim:

1. A tire inflator comprising:
an outer disk and an inner disk, both configured to rotate with a vehicle wheel;
a ring residing axially between at least a portion of the outer disk and at least a portion of the inner disk and free to rotate with respect to the outer disk and the inner disk;
seals residing radially between a round surface of at least one of the outer disk and the inner disk, and the ring, the seals residing at a seal radius (R1) inside a wheel stud radius (R2);
an air inlet in fluid communication with the ring;
an air passage between ring and at least one of the outer disk and the inner disk;
an air outlet fixed to the outer disk;
a tire in fluid communication with the air inlet through the air passage and through the air outlet;
an air supply/bleed unit in fluid communication with the air inlet; and a control in communication with the air supply/bleed unit to command the air supply/bleed unit to provide an air flow to the air inlet or to bleed air from the air inlet.

2. The tire inflator of claim 1, wherein the ring resides axially between a brake drum and a mounting surface of the vehicle wheel.

3. The tire inflator of claim 1, wherein the ring resides axially between a brake rotor and a mounting surface of the vehicle wheel.

4. The tire inflator of claim 1, wherein the outer disk comprises a center of the vehicle wheel.

5. The tire inflator of claim 4, wherein the air outlet releases the airflow radially.

6. The tire inflator of claim 5, further including a retainer fixed to a rear side of the wheel retaining the ring on the wheel.

7. The tire inflator of claim 1, wherein the outer disk is a wheel spacer for the vehicle wheel.

8. The tire inflator of claim 1, wherein the outer disk is a portion of a hub for mounting the vehicle wheel.

9. The tire inflator of claim 1, wherein the taper seals are made of carbon-PTFE.

10. The tire inflator of claim 1, wherein rotation of the ring is limited by first and second ring positioners cooperating with a brake caliper, the first ring positioner residing angularly before the brake caliper and the second ring positioner residing angularly after the brake caliper.

11. The tire inflator of claim 1, wherein the ring positioners are each attached to the ring by two bolts passing through angularly extending slots in the ring positioners and are angularly adjustable to angularly position an inlet nipple to align with an air line.

12. A tire inflator comprising:
a disk center portion of a vehicle wheel;
a ring residing radially with respect to the disk and free to rotate with respect to the vehicle wheel;
a retainer fixed to a rear side of the wheel center portion retaining the ring on the wheel;
an air inlet in fluid communication with the ring;
a first air passage between ring and the disk between a pair of seals;
a tire mounted to the vehicle wheel and in fluid communication with the disk through a second air passage;
at least one ring positioner cooperating the ring and engaging a non-rotating vehicle part to limit rotation of the ring;
an air supply/bleed unit in fluid communication with the air inlet; and
a control in communication with the air supply/bleed unit to command the air supply/bleed unit to provide an air flow to the air inlet or to bleed air from the air.

13. The tire inflator of claim 12, wherein retainer is fixed to a rear side of the wheel.

14. The tire inflator of claim 12, wherein the air outlet releases the airflow radially from the disk.

15. The tire inflator of claim 12, wherein:
the seals reside radially between a round surface of at least one of the outer disk and the inner disk, and the ring; and
the seals reside at a seal radius (R1) inside a wheel stud radius (R2).

16. A tire inflator comprising:
a disk configured to rotate with a vehicle wheel and having an annular outer surface;
a ring attached to the disk and free to rotate on the annular outer surface of the disk with respect to the disk and wheel;
seals residing between the ring and the disk;
an air inlet in fluid communication with the ring;
an air passage between ring and the disk through the seals;
an air outlet in fluid communication with the disk;
a tire in fluid communication with the air outlet;
an air supply/bleed unit in fluid communication with the air inlet;
first and second ring positioners cooperating a brake caliper, the first ring positioner residing angularly before the brake caliper and the second ring positioner residing angularly after the brake caliper; and
a control in communication with the air supply/bleed unit to command the air supply/bleed unit to provide an air flow to the air inlet or to bleed air from the air.

17. The tire inflator of claim 16, wherein the ring positioners are each attached to the ring by two bolts passing through angularly extending slots in the ring positioners and into the ring, the ring positioners angularly adjustable to angularly position an inlet nipple to align with an air line.

18. The tire inflator of claim 16, wherein threaded holes are angularly spaced apart on the ring providing a coarse adjustment of the first and second ring positioners.

19. The tire inflator of claim 16, wherein:
the seals reside radially between a round surface of at least one of the outer disk and the inner disk, and the ring; and
the seals residing at a seal radius (R1) inside a wheel stud radius (R2).

* * * * *